(12) United States Patent
Hör et al.

(10) Patent No.: US 11,746,748 B2
(45) Date of Patent: Sep. 5, 2023

(54) WIND ENERGY INSTALLATION AND A METHOD OF OPERATING A WIND ENERGY INSTALLATION

(71) Applicant: Siemens Gamesa Renewable Energy Service GmbH, Hamburg (DE)

(72) Inventors: Oliver Hör, Bredenbek (DE); Stefan Behl, Neumünster (DE); Karsten Warfen, Weede/Söhren (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 96 days.

(21) Appl. No.: 17/366,591

(22) Filed: Jul. 2, 2021

(65) Prior Publication Data
US 2022/0003208 A1    Jan. 6, 2022

(30) Foreign Application Priority Data

Jul. 3, 2020   (DE) ............. 10 2020 004 034.9
Jul. 3, 2020   (DE) ............. 10 2020 004 035.7
Jul. 3, 2020   (DE) ............. 10 2020 004 036.5

(51) Int. Cl.
F03D 7/02    (2006.01)

(52) U.S. Cl.
CPC ......... *F03D 7/0264* (2013.01); *F03D 7/0224* (2013.01); *F05B 2260/70* (2013.01); *F05B 2260/76* (2013.01)

(58) Field of Classification Search
CPC .............................. F03D 7/0264; F03D 7/0224
See application file for complete search history.

(56) References Cited

U.S. PATENT DOCUMENTS 7,218,012 B1 * 5/2007 Edenfeld ............ F03D 9/25
                                                      290/55
7,602,074 B2   10/2009 Voss
(Continued)

FOREIGN PATENT DOCUMENTS

DE    10253811 A1    6/2004
DE    10335575 A1    3/2005
(Continued)

OTHER PUBLICATIONS

European Patent Office; Office Action in related European Patent Application No. 21 183 319.9 dated Nov. 16, 2021; 7 pages.
(Continued)

*Primary Examiner* — Michael L Sehn
(74) *Attorney, Agent, or Firm* — Dorton & Willis, LLP (57) ABSTRACT

A method of operating a wind energy installation wherein a rotor has a first rotor blade which can be angularly adjusted, a first adjustment drive for adjusting the rotor blade, and a safety control system. In a normal mode of operation, the first adjustment drive is supplied with energy from a source and is controlled by a first pitch control system. In a failure mode of operation, the supply of energy to the first adjustment drive is switched from the source to an energy storage device and the safety control system monitors a position and/or movement of the first rotor blade. The first rotor blade is adjusted by the first adjustment drive in a direction of a predetermined stopping position, while the safety control system, as a function of the monitored position and/or movement, enables or effects a deactivation of a first power supply shut-off device. In the failure mode of operation, the safety control system, as a function of the monitored position and/or movement, closes a first pitch brake and activates a first blocking mode in which the supply of energy to the
(Continued)

first adjustment drive from the energy storage device and/or an opening of the first pitch brake is prevented.

13 Claims, 2 Drawing Sheets

(56) References Cited

U.S. PATENT DOCUMENTS

| | | | |
|---|---|---|---|
| 7,764,029 | B2 | 7/2010 | Buente et al. |
| 8,157,523 | B2 | 4/2012 | Warfen et al. |
| 9,086,048 | B2 * | 7/2015 | Roesmann ............... H02P 27/08 |
| 9,677,541 | B2 | 6/2017 | Fahrner |
| 9,777,710 | B2 | 10/2017 | Muik |
| 9,879,652 | B2 | 1/2018 | Eden et al. |
| 2012/0146333 | A1 | 6/2012 | Bywaters et al. |
| 2013/0020804 | A1 | 1/2013 | Roesmann et al. |
| 2013/0134708 | A1 | 5/2013 | Hamano |
| 2013/0243624 | A1 | 9/2013 | Schaefer et al. |
| 2019/0010924 | A1 | 1/2019 | Theopold et al. |

FOREIGN PATENT DOCUMENTS

| | | |
|---|---|---|
| DE | 102004024563 A1 | 12/2005 |
| DE | 102006049490 A1 | 4/2008 |
| DE | 102007049368 A1 | 5/2008 |
| DE | 102007052863 A1 | 5/2009 |
| DE | 202010004045 U1 | 8/2011 |
| DE | 10 2010 016105 A1 | 9/2011 |
| DE | 102010019444 A1 | 11/2011 |
| DE | 102010037695 A1 | 3/2012 |
| DE | 102012101484 A1 | 8/2013 |
| DE | 102013004580 A1 | 9/2014 |
| DE | 102015010227 A1 | 2/2017 |
| DE | 102016111859 A1 | 1/2018 |
| GB | 2 545 719 A | 6/2017 |
| WO | 2012069532 A1 | 5/2012 |

OTHER PUBLICATIONS

German Patent Office; Search Report in related German Patent Application No. 10 2020 004 034.9 dated May 5, 2021; 6 pages.
German Patent Office; Search Report in related German Patent Application No. 10 2020 004 035.7 dated May 4, 2021; 7 pages.
German Patent Office; Search Report in related German Patent Application No. 10 2020 004 036.5 dated May 7, 2021; 6 pages.
German Technical Standards; DIN EN 61508-1 (VDE 0803-1) 2011-02-00.
German Technical Standards; DIN EN 61511-1 (VDE 0810-1) 2019-02-00.
German Technical Standards; DIN EN 61508-5 (VDE 0803-5) 2011-02-00.
German Technical Standards; DIN EN 61511-3 (VDE 0810-3) 2019-02-00.

* cited by examiner

WIND ENERGY INSTALLATION AND A METHOD OF OPERATING A WIND ENERGY INSTALLATION

CROSS-REFERENCE TO RELATED APPLICATIONS

This application claims the benefit of priority under 35 U.S.C. § 119(a) to German Patent Application Nos. DE 10 2020 004 034.9, filed Jul. 3, 2020 (pending), DE 10 2020 004 035.7, filed Jul. 3, 2020 (pending), and DE 10 2020 004 036.5, filed Jul. 3, 2020 (pending), the disclosures of which are hereby incorporated by reference in their entirety.

TECHNICAL FIELD

The present invention relates to a wind energy installation, a method of operating a wind energy installation, as well as a computer program product for carrying out the method.

BACKGROUND

Wind energy installations with rotor blades which can be adjusted in terms of their angle are known from internal practice within the present applicant company.

By adjusting the rotor blades to a feathered position, in which they, at least substantially, do not generate any power at a rotor axis of rotation or at a rotor hub, in particular a power of the wind energy installation can be controlled and/or a load can be reduced in case of (too) strong wind.

In normal operation, adjustment drives for adjusting the rotor blades are supplied with (drive) energy from a source of energy, for example electromotive adjustment drives are supplied with (drive) energy from an (electricity) grid, or hydraulic adjustment drives are supplied with (drive) energy from a hydraulic system.

In the event of a failure of this primary power supply, it is known from internal practice within the present applicant company, in a special mode of operation, to connect adjustment drives to an energy storage device instead, for example to connect electromotive adjustment drives to a rechargeable battery, or to connect hydraulic adjustment drives to a (hydraulic) pressure storage device, so that they are turned to the feathered position in an uncontrolled manner, but in a manner which is safe.

When the feathered position has been reached, this power supply from the energy storage device is switched off or interrupted, for example by a contactor in the case of electromotive adjustment drives or by an automatic switching valve in the case of hydraulic adjustment drives. In the case of hydraulic adjustment cylinders as the drive, the feathered position can also be limited by a mechanical end stop.

In this way, in the event of a failure of the power supply from the source of energy, the rotor blades can be turned to their feathered position in a simple and thus reliable manner, and in particular this adjustment can (reliably) be terminated there.

SUMMARY

It is an object of the present invention to improve the operation of a wind energy installation.

This object is solved by a method, a wind energy installation, and a computer program product for carrying out a method as described herein.

According to one embodiment of the present invention, a wind energy installation comprises a rotor with at least one rotor blade which can be adjusted in terms of its angle, and which, without loss of generality, is referred to herein as the first rotor blade, and an adjustment drive (which, in a corresponding manner, is referred to as the first adjustment drive), with the aid of which this rotor blade can be adjusted (in terms of its angle) or is adjusted (in terms of its angle) or is provided for this purpose, or is in particular set up for this purpose or is used for this purpose, in particular by means of which this rotor blade can be adjusted (in terms of its angle) or is adjusted (in terms of its angle) or is provided for this purpose, or is in particular set up for this purpose or is used for this purpose.

According to one embodiment, the rotor is mounted on a nacelle of the wind energy installation so as to be able to rotate about a rotor axis of rotation, in particular a horizontal rotor axis of rotation, and according to one embodiment it is coupled to a generator for converting a rotation of the rotor or a power of the rotor into electrical energy, in particular for feeding into an (power supply or electricity) grid. According to one embodiment, the nacelle is arranged on a tower and, according to one embodiment, is able to be rotated, by means of a nacelle drive, about a vertical nacelle axis of rotation.

According to one embodiment, the rotor comprises a plurality of rotor blades which can be adjusted in terms of their angle, according to one embodiment three rotor blades which can be adjusted in terms of their angle, and which, according to one embodiment, are distributed (or are arranged in a distributed manner) along a circumference of the rotor.

Without being limited thereto, the present invention is particularly suitable for such wind energy installations, in particular because of the loads and operating conditions encountered in connection with these.

According to one embodiment, one or more rotor blades of the rotor, in particular all rotor blades of the rotor can (each) be adjusted (in terms of their angle) by means of their own adjustment drive.

According to one embodiment, by means of this, the blade pitch can be adjusted individually, and thereby the safety can be increased and/or the power control of the wind energy installation can be improved.

In the present application, an adjustment of a rotor blade (in terms of its angle) is intended to be understood to refer in particular to a rotation of the rotor blade about a rotor blade axis of rotation which extends in the longitudinal direction of the rotor blade and/or transverse to the rotor axis of rotation. In so far as an adjustment or a position is mentioned in the present application, this can be (respectively) a rotation or an angular position or an angular orientation about the rotor blade axis of rotation.

According to one embodiment of the present invention, the wind energy installation comprises a safety control device/system. According to one embodiment, this has full or partial redundancy; according to one embodiment, it has full or partial diversity; and according to one embodiment, it comprises at least one safety logic controller (SLC). According to one embodiment, the SLC is a safety control device/system according to IEC 61508/IEC61511 with safety integrity level (SIL) SIL2 or SIL3, which according to one embodiment is arranged in the rotor hub of the wind energy installation.

By means of this, according to one embodiment, despite the departure from known safety concepts explained below, their safety standard or safety level can be realized.

According to one embodiment of the present invention, in a normal mode of operation, the first adjustment drive is powered from a source of energy and is controlled by a first pitch control device/system. According to an embodiment in which the rotor comprises at least one further rotor blade which can be adjusted in terms of its angle and a further adjustment drive for adjusting this further rotor blade, in the normal mode of operation the further adjustment drive is supplied with energy from the source of energy and is controlled by the first or a further pitch control device/system.

By means of this, rotor blades can advantageously be adjusted, according to one embodiment individually, and thereby the efficiency and/or the safety of the wind energy installation can be improved, according to one embodiment.

According to one embodiment of the present invention, in a failure mode of operation, the power supply of the first adjustment drive is switched over, in particular a switching takes place, from the source of energy to a (first) energy storage device and the safety control device/system monitors (at least temporarily during the failure mode of operation) a position and/or a movement of the first rotor blade.

According to one embodiment, in the failure mode of operation, the power supply of the further adjustment drive is switched over, in particular a switching takes place, from the source of energy to the (same or the first) energy storage device or to a further energy storage device, and the safety control device/system monitors (at least temporarily during the failure mode of operation) a position and/or a movement of the further rotor blade.

According to one embodiment, the failure mode of operation is carried out if a malfunction occurs in the power supply of the first adjustment drive and/or of the further adjustment drive from the source of energy, according to one embodiment it is activated or triggered by this.

The present invention is suitable in particular for such malfunctions, without being limited to this. For example, according to one embodiment, the failure mode of operation can, in addition or as an alternative, also be carried out or can be activated or triggered if the first adjustment drive, the further adjustment drive, the first pitch control device/system or the further pitch control device/system has a malfunction, in particular if it/they is/are defective, in particular if this is detected by the safety control device/system.

According to one embodiment of the present invention, the wind energy installation has a first power supply shut-off device which shuts off the power supply to the first adjustment drive from the (first) energy storage device as a result of a position of the first rotor blade in a predetermined (first) shut-off range, or is provided for this purpose, in particular is set up for this purpose or is used for this purpose.

According to one embodiment, the wind energy installation has a further power supply shut-off device which shuts off the power supply to the further adjustment drive from the (first or the further) energy storage device as a result of a position of the further rotor blade in a predetermined (further) shut-off range, or is provided for this purpose, in particular is set up for this purpose or is used for this purpose.

According to one embodiment, the first and/or the further power supply shut-off device has (in each case) at least one contactor for shutting off an electrical power supply, or at least one switching valve for shutting off a hydraulic power supply, which according to one embodiment is actuated by the (respective) rotor blade or the respective adjustment drive.

In this way, according to one embodiment, in particular in the manner explained in the introduction, a safe stopping of the (respective) rotor blade in the (respective) shut-off range can be realized.

According to one embodiment of the present invention, in the failure mode of operation, the first rotor blade is adjusted by the first adjustment drive in the direction of a predetermined (first) stopping position, and in a further development, which according to one embodiment may be independent thereof, the further rotor blade is also adjusted by the further adjustment drive in the direction of a predetermined (further) stopping position.

In this way, according to one embodiment, in particular in the manner explained in the introduction, a safe approach to a feathered position of the (respective) rotor blade, in which the latter, at least substantially, does not generate any power at a rotor axis of rotation or at a rotor hub, or also to a spinning position, in particular a spinning position which is reached beforehand, in particular in order to improve lubrication and/or a static load, can be realized, wherein, according to one embodiment, the spinning position deviates from the feathered position by at least 5 degrees and/or at most 15 degrees. In a corresponding manner, the (first or the further) stopping position, according to one embodiment, is such a feathered position or such a spinning position of the (respective) rotor blade.

According to one embodiment of the present invention, in the failure mode of operation, during this approach to the (first) stopping position with the first rotor blade, a deactivation of the first power supply shut-off device is (directly) effected or is enabled, in particular actively enabled, according to one embodiment by means of at least one corresponding signal, and in particular such an effecting or enabling takes place, by means of the safety control device/system as a function of the monitored position and/or movement of the first rotor blade.

According to one embodiment, in the failure mode of operation, during the approach to the (further) stopping position with the further rotor blade, a deactivation of the further power supply shut-off device is (directly) effected or is enabled, in particular actively enabled, according to one embodiment by means of at least one corresponding signal, and in particular such an effecting or enabling takes place, by means of the safety control device/system as a function of the monitored position and/or movement of the further rotor blade, according to one embodiment effected or enabled independently of the first power supply shut-off device.

According to one embodiment, the safety control device/system effects the deactivation, according to one embodiment by the safety control device/system itself, or directly, controlling the corresponding power supply shut-off device. According to one embodiment, the safety control device/system enables the deactivation, according to one embodiment it enables the deactivation by means of the (respective, i.e. the first or, if applicable, the further) pitch control device/system, by enabling, in particular actively enabling, a corresponding deactivation with respect to this pitch control device/system, according to one embodiment by means of at least one corresponding signal, or by controlling this pitch control device/system in a corresponding manner.

This represents a deliberate departure from previous safety concepts, which seek to ensure that the rotor blade, when it is adjusted in the direction of the shut-off range, is stopped by means of supply of energy from the energy storage device by means of power supply shut-off devices which are always active. In the present application, the term "deactivation of a power supply shut-off device" is intended to be understood to mean in particular that the deactivated power supply shut-off device does not shut off the power supply to the (respective) adjustment drive from the (respective) energy storage device, even though the position of the (respective) rotor blade is in the (respective) shut-off range, and, in a corresponding manner, the term "activation of a power supply shut-off device" is intended to be understood to mean in particular that the active (or activated) power supply shut-off device switches off the power supply to the (respective) adjustment drive from the (respective) energy storage device when the position of the (respective) rotor blade lies in the (respective) shut-off range. This can be realized in particular by a contactor or the contactor being switched in a suitable manner or by a switching valve or the switching valve being blocked (or unblocked) in a suitable manner, in particular by means of the safety control device/system or the respective (i. e. the first or, if applicable, the further) pitch control device/system.

By means of this deliberate departure from previous safety concepts, according to one embodiment, in an advantageous manner, a stopping position can be approached in a precise or in a more precise manner and/or can be specified more flexibly, and can in particular also lie within the (respective) stopping range. In a corresponding manner, according to one embodiment, the first stopping position lies within the first shut-off range and/or the further stopping position lies within the further shut-off range. According to one embodiment, the first shut-off range thus comprises, in addition to the first stopping position, a plurality of further positions, and/or the further shut-off range thus comprises, in addition to the further stopping position, a plurality of further positions, and according to one embodiment the first and/or the further shut-off range extends (in each case) over at least 2 degrees.

By means of this, according to one embodiment, the safety can be improved, in particular the likelihood of an undesired slipping away from the stopping range can be reduced.

In addition or as an alternative, by means of this, in particular in comparison to a fixedly predefined stopping range of a power supply shut-off device, in particular in comparison to a mechanically predefined stopping range of a power supply shut-off device, the stopping position can be adapted to a condition of the wind energy installation and/or its environment, in particular to different wind forces. Accordingly, for example in stronger winds, a spinning position which is closer to the feathered position can be specified or approached as the stopping position, and in weaker winds, a spinning position which is further away from the feathered position can be specified or approached as the stopping position.

In a corresponding manner, according to one embodiment, the (first and/or the further) stopping position is specified, according to one embodiment the (first and/or the further) stopping position is changed or updated, on the basis of a condition of the wind energy installation and/or its environment, according to one embodiment on the basis of a current and/or a predicted condition of the wind energy installation and/or its environment, in particular on the basis of a wind force, according to one embodiment on the basis of a current and/or a predicted wind force.

By means of this, according to one embodiment, the safety can be improved.

According to one embodiment, after the (first) stopping position has been reached, the safety control device/system switches off the supply of energy to the first adjustment drive from the energy storage device before it causes a (re-) activation of the first power supply shut-off device or (re-) enables a (re-) activation of the first power supply shut-off device. According to one embodiment, after the further stopping position has been reached, the safety control device/system switches off the power supply to the further adjustment drive from the (first or the further) energy storage device before it causes a (re-) activation of the further power supply shut-off device or (re-) enables a (re-) activation of the further power supply shut-off device, according to one embodiment independently of a (de)activation of the first power supply shut-off device.

By means of this, according to one embodiment, a switching off of the power supply under load by the (respective) power supply shut-off device, or a hard interruption of the power supply by the (respective) power supply shut-off device can be reduced, and, by means of this, in particular, its load and/or wear can be reduced.

According to one embodiment, the safety control device/system (re-) enables an activation of the first power supply shut-off device or causes a (re-) activation of the first power supply shut-off device if it detects a fault when the (first) stopping position is being approached with the first rotor blade, according to one embodiment if it detects a malfunction of the first pitch control device/system, according to one embodiment if a deviation of the position, monitored by it, of the first rotor blade from a predetermined position and/or a deviation of the movement, monitored by it, of the first rotor blade from a predetermined movement exceeds a predetermined tolerance range. According to one embodiment, the safety control device/system (re-) enables an activation of the further power supply shut-off device or causes a (re-) activation of the further power supply shut-off device if it detects a fault when the further stopping position is being approached with the further rotor blade, according to one embodiment if it detects a malfunction of the first or the further pitch control device/system controlling the further adjustment drive, according to one embodiment if a deviation of the position, monitored by it, of the further rotor blade from a predetermined position and/or a deviation of the movement, monitored by it, of the further rotor blade from a predetermined movement exceeds a predetermined tolerance range.

By means of this, according to one embodiment, the safety can be improved.

According to one embodiment, the first adjustment drive is controlled by the first pitch control device/system for the purpose of, or during the course of, adjusting the first rotor blade in the direction of the (first) stopping position. According to one embodiment, the further adjustment drive is controlled by the first or the further pitch control device/system for the purpose of, or during the course of, adjusting the further rotor blade in the direction of the further stopping position, according to one embodiment by the first or the further pitch control device/system individually or independently of the first pitch control device/system.

By means of this, according to one embodiment, a pitch control device/system which is specific to the respective adjustment drive, or a pitch control device/system which is responsible for a plurality of adjustment drives or which controls these, or which, according to one embodiment, controls these individually, can also be used for the controlled approach to the stopping position while being supplied with energy from the energy storage device when the power supply shut-off device is deactivated, and, in this way, according to one embodiment, the effort required to design the safety control device/system and/or its tasks can be reduced.

According to one embodiment, the first adjustment drive is controlled by the first safety control device/system for the purpose of, or during the course of, adjusting the first rotor blade in the direction of the (first) stopping position. According to one embodiment, the further adjustment drive is controlled by the safety control device/system for the purpose of, or during the course of, adjusting the further rotor blade in the direction of the further stopping position, according to one embodiment independently of the first rotor blade.

By means of this, according to one embodiment, the safety can be improved, and in particular this can allow the stopping position to be approached even in the event of a malfunction of the respective pitch control device/system.

According to one embodiment, the wind energy installation has a second power supply shut-off device which shuts off the power supply to the first adjustment drive from the energy storage device as a result of an adjustment of the first rotor blade beyond the first shut-off range into a second shut-off range, or is provided for this purpose, or is in particular set up for this purpose or is used for this purpose.

According to one embodiment, the wind energy installation has another power supply shut-off device which shuts off the power supply to the further adjustment drive from the (first or the further) energy storage device as a result of an adjustment of the further rotor blade beyond the further shut-off range into another shut-off range, or is provided for this purpose, or is in particular set up for this purpose or is used for this purpose.

According to one embodiment, (each of) the second and/or the other power supply shut-off device has at least one contactor for switching off an electrical power supply, or at least one switching valve for cutting off a hydraulic power supply, which according to one embodiment is actuated by the (respective) rotor blade or the respective adjustment drive.

By means of this, according to one embodiment, the safety can be improved.

According to one embodiment, during the approach to the (first) stopping position with the first rotor blade in the failure mode of operation, a deactivation of the second power supply shut-off device is (also) effected (directly) by the safety control device/system as a function of the monitored position and/or monitored movement of the first rotor blade or is enabled, in particular actively enabled, according to one embodiment by means of at least one corresponding signal, in particular such an effecting or enabling takes place.

According to one embodiment, during the approach to the (further) stopping position with the further rotor blade in the failure mode of operation, a deactivation of the other power supply shut-off device is (also) effected (directly) by the safety control device/system as a function of the monitored position and/or monitored movement of the further rotor blade or is enabled, in particular actively enabled, according to one embodiment by means of at least one corresponding signal, according to one embodiment effected or enabled independently of the first power supply shut-off device, in particular such an effecting or enabling takes place.

By means of this, according to one embodiment, a stopping position can advantageously be approached that is located in the second or in the other shut-off range, in particular a stopping position in the region of a feathered position after passing over a first or a further spinning position shut-off range which is reached beforehand.

In addition or as an alternative to the aspect described herein of a controlled approach to a stopping position while being supplied with energy from an energy storage device when the power supply shut-off device is deactivated, the wind energy installation comprises, according to one embodiment of the present invention, a first pitch brake which (in the closed state) stops the first rotor blade or is provided for this purpose, or is in particular set up for this purpose or is used for this purpose, and a (first) pitch brake closing switching device which closes the first pitch brake in case a position of the first rotor blade is in a (first) pitch brake closing range, or is provided for this purpose, or is in particular set up for this purpose or is used for this purpose. According to one embodiment, the (first) pitch brake closing range lies within the (first) shut-off range or is identical to it or overlaps with it.

According to one embodiment, the wind energy installation has a further pitch brake which (in the closed state) stops the further rotor blade or which is provided for this purpose, or which is in particular set up for this purpose or is used for this purpose, according to one embodiment independently of the first pitch brake, and a further pitch brake closing switching device which closes the further pitch brake in case a position of the further rotor blade lies in a further pitch brake closing range, or which further pitch brake closing switching device is provided for this purpose, or which is in particular set up for this purpose or is used for this purpose, according to one embodiment independently of the first pitch brake. According to one embodiment, the further pitch brake closing range lies within the further shut-off range or is identical to it or overlaps with it.

According to one embodiment of the present invention, in the failure mode of operation, as a function of the monitored position and/or movement of the first rotor blade, the safety control device/system closes the first pitch brake instead of the (first) pitch brake closing switching device and activates a first blocking mode in which the power supply to the first adjustment drive and/or an opening of the first pitch brake is prevented, according to one embodiment before the (first) pitch brake closing range has been reached.

According to one embodiment, in the failure mode of operation, as a function of the monitored position and/or movement of the further rotor blade, the safety control device/system closes the further pitch brake instead of the further pitch brake closing switching device and activates a further blocking mode in which the power supply to the further adjustment drive and/or an opening of the further pitch brake is prevented, according to one embodiment independently of the first blocking mode and/or before the further pitch brake closing range has been reached.

This is based in particular on the realization that in previous safety concepts the pitch brakes are open during the approach to the shut-off range and are only closed (again) as a consequence of the respective pitch brake closing range having been reached, so that such an (automatic) closing in the pitch brake closing range requires the pitch brake closing range to have been reached by adjusting the respective rotor blade.

However, if, in the course of this, a malfunction occurs, for example if the corresponding adjustment drive is defective, it is possible for the corresponding pitch brake to remain open and accordingly for the corresponding rotor blade to move in an uncontrolled manner.

Based on this, according to the aspect of the present invention described herein, it is proposed to provide, in addition to closing by means of the pitch brake closing switching device or by means of one or more of the pitch brake closing switching devices, a closing of the (respective) pitch brake also by means of the safety control device/system, in particular in case that its monitoring of the position or of the movement of the (respective) rotor blade indicates that an fault occurs during the course of the approach to the (respective) pitch brake closing range.

According to one embodiment, the safety control device/system accordingly closes the first pitch brake in case a deviation of the position of the first rotor blade monitored by the safety control device/system from a predetermined position and/or a deviation of the movement of the first rotor blade monitored by the safety control device/system from a predetermined movement exceeds a predetermined tolerance range, in particular in case a distance (of the position) of the first rotor blade from the (first) pitch brake closing range does not decrease in a predetermined manner, in particular in case this distance increases.

According to one embodiment, the safety control device/system closes the further pitch brake in case a deviation of the position of the further rotor blade monitored by the safety control device/system from a predetermined position and/or a deviation of the movement of the further rotor blade monitored by the safety control device/system from a predetermined movement exceeds a predetermined tolerance range, in particular in case a distance (of the position) of the further rotor blade from the further pitch brake closing range does not decrease in a predetermined manner, in particular in case this distance increases.

In particular, in order to relieve the pitch brake closed in this way, according to one embodiment the safety control device/system additionally prevents the power supply to the first adjustment drive from the (first) energy storage device in the first activated blocking mode, according to one embodiment by switching off the power supply to the first adjustment drive and/or by preventing control of the first adjustment drive for adjusting the first rotor blade. According to one embodiment, the safety control device/system prevents the power supply to the further adjustment drive from the (first or the further) energy storage device in the further activated blocking mode, according to one embodiment by switching off the power supply to the further adjustment drive and/or by preventing control of the further adjustment drive for adjusting the further rotor blade.

In addition or as an alternative, in the first activated blocking mode, the safety control device/system prevents opening of the first pitch brake (closed by the safety control device/system) and/or, in the further activated blocking mode, the safety control device/system prevents opening of the further pitch brake (closed by the safety control device/system).

By means of this, according to one embodiment, the safety can be improved.

This aspect also represents a deliberate departure from known safety concepts which, in the event of a malfunction, always mandatorily provide for power to be supplied to the pitch adjustment drives by the energy storage device or energy storage devices in order to approach the feathered position. As explained above, it is only the present invention that has recognized that, if the adjustment into the pitch brake closing range unintentionally does not occur, the pitch brake will not be closed by the pitch brake closing switching device provided for this purpose. By preventing the adjustment drive from being supplied with energy from the energy storage device and by preventing the pitch brake from being opened after the pitch brake has been closed by the safety control device/system (instead of by the pitch brake closing switching device), the rotor blade can be reliably held in its current position according to one embodiment.

In the present application, the term "activation of a blocking mode" is intended to be understood to refer in particular to the execution of the blocking mode, and in particular to the switching to the blocking mode. According to one embodiment, the activation of the first blocking mode requires a switching of at least two switching means, according to one embodiment two relays, valves or the like, by the safety control device/system, and/or the activation of the further blocking mode requires a switching of at least two switching means, according to one embodiment two relays, valves or the like, by the safety control device/system.

By means of this, according to one embodiment, the safety can be improved.

According to one embodiment, the (activated) first and/or the (activated) further blocking mode can be deactivated (again). According to one embodiment, a deactivation of the first blocking mode requires a manual input and/or an individual (first) input (individual with respect to the rotor blade and/or the adjustment drive) for the first adjustment drive. According to one embodiment, a deactivation of the further blocking mode requires a manual input and/or an individual further input (individual with respect to the rotor blade and/or the adjustment drive) for the further adjustment drive.

By means of this, according to one embodiment, the safety can be improved.

As explained above, aspects of the present invention represent a deliberate, and in some cases radical, departure from previous safety concepts.

In particular, therefore, according to one embodiment, the safety control device/system monitors the position and/or the movement of the first rotor blade and/or the position and/or the movement of the further rotor blade (in each case) in a redundant manner, and in a further embodiment with diversity and/or with the aid of at least two redundant sensors. By means of this, it becomes possible (or only by means of this does it become possible), surprisingly, to achieve a comparable safety level despite the departure from previous safety concepts.

According to one embodiment, (each of) the first adjustment drive and/or the further adjustment drive has at least one electric motor, according to one embodiment at least one DC motor, and/or according to one embodiment the energy storage device for supplying energy to this adjustment drive (in each case) comprises an electrical energy storage device, in particular one or more primary and/or one or more secondary batteries or rechargeable batteries and/or one or more capacitors, in particular super capacitors or ultra capacitors (super caps or ultra caps).

In particular, since such adjustment drives are particularly affected by a power failure, the present invention is particularly advantageous for this purpose. In this context, the present invention is particularly advantageous for DC motors due to their electrical characteristics.

According to one embodiment, each of the first adjustment drive and/or the further adjustment drive has at least one hydraulic actuator, in particular at least one hydraulic cylinder, and according to one embodiment, the energy storage device comprises (in each case) a single-chamber (hydraulic) pressure accumulator or a single-chamber (hydraulic) pressure energy storage device or a multi-chamber (hydraulic) pressure accumulator or a multi-chamber (hydraulic) pressure energy storage device for supplying energy to this adjustment drive, according to one embodiment a hydropneumatic storage device (or a hydropneumatic pressure accumulator or a hydropneumatic pressure energy storage device). Accordingly, hydraulic pressure (or a hydraulic pressure supply) for (angular) adjustment of a rotor blade by its hydraulic adjustment drive is also referred to as (a pressure) energy (supply) in the sense of the present invention, and/or the term "energy" is intended to be understood to also refer, in particular, to drive energy for the adjustment drive, in particular, therefore, electrical energy for an electromotive adjustment drive or hydraulic pressure (energy) for a hydraulic adjustment drive. In other words, according to one embodiment, the word "energy" can be replaced by "(hydraulic) pressure" in the present application.

The present invention can also be used to particular advantage in such adjustment drives, in particular because of their construction and their way of operation.

According to one embodiment of the present invention, a wind energy installation or the wind energy installation is set up, in particular in terms of hardware and/or software, to carry out a method described herein, and/or comprises:

means for powering an adjustment drive or the first adjustment drive from a source of energy or from the source of energy and for controlling by means of a pitch control device/system or the first pitch control device/system in a normal mode of operation or in the normal mode of operation; and means for switching the power supply of the first adjustment drive from the source of energy over to a (first) energy storage device or the (first) energy storage device and monitoring a position and/or a movement of the first rotor blade by means of the safety control device/system in a failure mode of operation or in the failure mode of operation; as well as at least one of the following means:

(i) means for adjusting the first rotor blade by means of the first adjustment drive in the direction of a predetermined (first) stopping position or the predetermined (first) stopping position, while the safety control device/system, as a function of the monitored position and/or movement of the first rotor blade, enables or effects a deactivation of a first power supply shut-off device or the first power supply shut-off device, which is set up to cut off the power supply to the first adjustment drive as a result of a position of the first rotor blade in a (first) shut-off range or in the (first) shut-off range, in the failure mode of operation; and/or (ii) means for closing a first pitch brake or the first pitch brake for stopping the first rotor blade by means of the safety control device/system as a function of the monitored position and/or movement of the first rotor blade instead of a (first) pitch brake closing switching device or the (first) pitch brake closing switching device, which is arranged to close the first pitch brake in case a position of the first rotor blade lies in a (first) pitch brake closing range or in the (first) pitch brake closing range, and for activating a first blocking mode or the first blocking mode in which the power supply to the first adjustment drive from the energy storage device is cut off and/or an opening of the first pitch brake is prevented, in the failure mode of operation.

According to one embodiment, the wind energy installation, or its means, comprises:

means for powering a further adjustment drive or the further adjustment drive from the source of energy and for controlling by means of the first pitch control device/system or a further pitch control device/system or the further pitch control device/system in the normal mode of operation;

means for switching the power supply of the further adjustment drive from the source of energy to the (same or the first or the further) energy storage device and for monitoring a position and/or a movement of the further rotor blade by the safety control device/system in the failure mode of operation;

means for adjusting the further rotor blade by means of the further adjustment drive in the direction of a predetermined further stopping position or the predetermined further stopping position, while the safety control device/system, as a function of the monitored position and/or movement of the further rotor blade, enables or effects a deactivation of a further power supply shut-off device or the further power supply shut-off device, which is set up to cut off the power supply to the further adjustment drive as a result of a position of the further rotor blade in a further shut-off range or in the further shut-off range, in the failure mode of operation;

means for closing a further pitch brake or the further pitch brake for stopping the further rotor blade by means of the safety control device/system as a function of the monitored position and/or movement of the further rotor blade instead of a further pitch brake closing switching device or the further pitch brake closing switching device, which is set up to close the further pitch brake in case a position of the further rotor blade lies in a further pitch brake closing range or in the further pitch brake closing range, and for activating a further blocking mode or the further blocking mode in which the power supply to the further adjustment drive from the (first or the further) energy storage device is cut off and/or an opening of the further pitch brake is prevented, in the failure mode of operation;

means, in particular at least two redundant sensors, for redundantly monitoring the position and/or the movement of the first rotor blade by means of the safety control device/system, as well as, according to one embodiment, means, in particular at least two redundant sensors, for redundantly monitoring the position and/or the movement of the further rotor blade by means of the safety control device/system; and/or means for presetting the (first and/or the further) stopping position within the (first and/or the further) shut-off range and/or on the basis of a condition of the wind energy installation and/or its environment.

According to one embodiment, the safety control device/system is set up to switch off the power supply to the first adjustment drive from the (first) energy storage device after the (first) stopping position has been reached, before it (re-) enables or causes the first power supply shut-off device to be (re-) activated, and according to one embodiment, it is set up to switch off the power supply to the further adjustment drive from the (first or the further) energy storage device after the further stopping position has been reached, before it (re-) enables or causes the further power supply shut-off device to be (re-) activated.

According to one embodiment, the safety control device/system is set up to (re-) enable or to cause the first power supply shut-off device to be (re-) activated if it detects a fault when the (first) stopping position is being approached with the first rotor blade, and according to one embodiment, it is set up to (re-) enable or to cause the further power supply shut-off device to be (re-) activated if it detects a fault when the further stopping position is being approached with the further rotor blade.

According to one embodiment, the first pitch control device/system or the safety control device/system is arranged to control the first adjustment drive to adjust the first rotor blade in the direction of the stopping position, and according to one embodiment, the first pitch control device/system or the further pitch control device/system or the safety control device/system is arranged to control the further adjustment drive to adjust the further rotor blade in the direction of the stopping position.

A means in the sense of the present invention can be constructed in terms of hardware and/or software, and may comprise in particular a processing unit, in particular a microprocessor unit (CPU) or a graphics card (GPU), in particular a digital processing unit, in particular a digital microprocessor unit (CPU), a digital graphics card (GPU) or the like, preferably connected to a memory system and/or a bus system in terms of data and/or signal communication, and/or may comprise one or more programs or program modules. The processing unit may be constructed so as to process instructions which are implemented as a program stored in a memory system, to acquire input signals from a data bus, and/or to output output signals to a data bus. A memory system may comprise one or more storage media, in particular different storage media, in particular optical media, magnetic media, solid state media and/or other non-volatile media. The program may be of such nature that it embodies the methods described herein, or is capable of executing them, such that the processing unit can execute the steps of such methods and thereby in particular operate the wind energy installation.

According to one embodiment, a computer program product may comprise a storage medium, in particular a non-volatile storage medium, for storing a program or having a program stored thereon, and may in particular be such a storage medium, wherein execution of said program causes a system or a control device/system, in particular a computer, to carry out a method described herein, or one or more of its steps.

According to one embodiment, one or more steps of the method, in particular all steps of the method, are carried out in a fully or partially automated manner, in particular by the wind energy installation, in particular its control devices/systems or its means.

According to one embodiment, the term "controlling" includes "controlling with feedback". A power supply shut-off device can comprise a pitch brake closing switching device, and in particular it can be a pitch brake closing switching device. A pitch-brake closing switching device can comprise a power supply shut-off device, and in particular it can be a power supply shut-off device.

According to one embodiment, a feathered position or the feathered position is a position which is at least substantially perpendicular to an orientation for maximum power output, or which is rotated by at least 85 degrees and/or at most 95 degrees with respect to such an orientation (such a normal orientation).

According to one embodiment, the source of energy comprises an (electricity) grid or a hydraulic system or a hydraulic grid or a hydraulic (pressure) source or a hydraulic (pressure) supply, and according to a further development, the source of energy is an (electricity) grid or a hydraulic system or a hydraulic grid or a hydraulic (pressure) source or a hydraulic (pressure) supply.

Further advantages and features will become apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
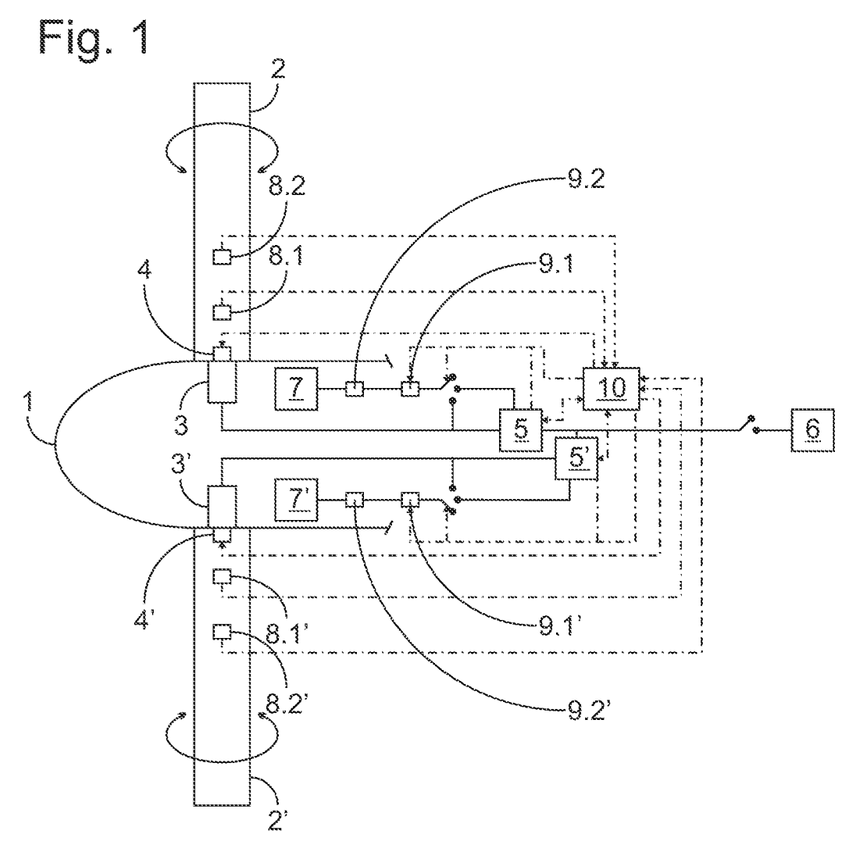
FIG. 1 shows a portion of a wind energy installation in accordance with an embodiment of the present invention.

FIG. 1 shows a portion of a wind energy installation in accordance with an embodiment of the present invention comprising a rotor 1 with three rotor blades which can be adjusted in terms of their angle, and of which a first rotor blade 2 and a further rotor blade 2' can be seen in FIG. 1.

Each of the rotor blades can be adjusted by means of its own electromotive or hydraulic adjustment drive 3 or 3', as indicated in FIG. 1 by double arrows representing a movement.

In a normal mode of operation, the adjustment drives 3, 3', for this purpose, are supplied with energy from a source of energy 6, for example an electricity grid or a hydraulic (pressure) source, and are controlled by pitch control devices/systems 5, 5', the first adjustment drive 3 for adjusting the first rotor blade 2 by a first pitch control device/system 5, and the further adjustment drive 3' for adjusting the further rotor blade 2' by a further pitch control device/system 5'. In a variation not shown, it is also possible for both adjustment drives 3, 3' to be controlled by a (common or a first) pitch control device/system.

In the event of a malfunction of the source of energy 6, the adjustment drives 3, 3' are instead supplied with energy from energy storage devices 7, 7' in a special mode of operation. In a variation not shown, two or more of the adjustment drives can also be supplied with energy from the same energy storage device.

This supply of energy is switched off by means of power supply shut-off devices 9.1, 9.2 or 9.1', 9.2', for example contactors or valves, when the rotor blades are in a spinning position range (9.1, 9.1' switching off) or in a feathered position range (9.2, 9.2' switching off).

In this context, two modes of operation of the special mode of operation are envisaged according to this embodiment: in the event that pitch control device/system 5 and/or 5' is functioning, this controls the corresponding adjustment drive 3 and/or 3', which is then supplied with energy from the energy storage device instead of from the source of energy. In the event that pitch control device/system 5 or 5' is defective, the corresponding adjustment drive 3 or 3' is supplied with energy directly from the energy storage device. In a variation not shown, one of the two modes of operation can also be omitted.

The wind energy installation further comprises pitch brakes for stopping the rotor blades, as well as redundant sensors for monitoring the position or the movement of the rotor blades, in particular a first pitch brake 4 for stopping the first rotor blade 2, as well as sensors 8.1, 8.2 for monitoring the first rotor blade 2, as well as a further pitch brake 4' for stopping the further rotor blade 2', as well as sensors 8.1', 8.2' for monitoring the further rotor blade 2'.

Figure 2:
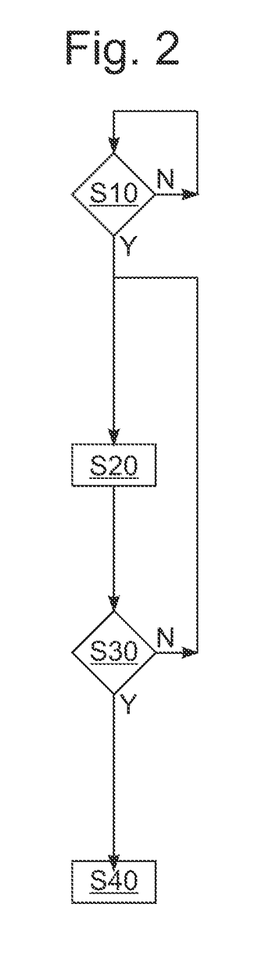
FIG. 2 shows a method of operating the wind energy installation in accordance with previous internal practice within the present applicant company.

In a method illustrated in FIG. 2 for operating the wind energy installation according to previous internal practice within the present applicant company, in the event of a malfunction in the source of energy 6 (S10: "Y"), a switchover is made to a failure mode of operation in which the adjustment drives 3, 3' adjust the rotor blades 2, 2' to their spinning positions or feathered positions while the pitch brakes 4, 4' are open (step S20), whereby the power supply shut-off devices 9.1-9.2' switch off this power supply (S40) as soon as the rotor blade has reached a corresponding shut-off range (S30: "Y"). By means of this, the pitch brakes 4, 4' are also closed (S40). Thus, the respective contactors or valves form both a power supply shut-off device as well as a pitch brake closing switching device.

Figure 3:
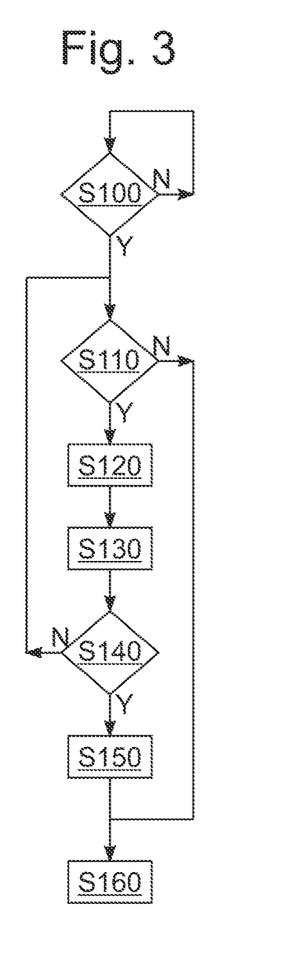
FIG. 3 shows a method of operating the wind energy installation in accordance with an embodiment of the present invention.

FIG. 3 shows a method of operating the wind energy installation in accordance with an embodiment of the present invention. Again, in the event of a malfunction of the source of energy 6 (S100: "Y"), a switchover is made to a failure mode of operation.

In this failure mode of operation, a safety control device/system 10 monitors the position and/or movement of the rotor blades 2, 2' (S110) by means of the redundant sensors 8.1-8.2'.

In this context, as long as a position and/or a movement of a rotor blade is within a permissible tolerance range about a predetermined position or movement, for example if the rotor blade follows a predetermined target movement into a stopping position or if a distance to a predetermined stopping position decreases (sufficiently fast) (S110: "Y"), the safety control device/system 10 deactivates the corresponding power supply shut-off device 9.1 and/or 9.1' or enables such a deactivation by the associated pitch control device/system 5, 5' (S120).

When the power supply shut-off device is deactivated in this way, the pitch control device/system or the safety control device/system controls the rotor blade to move to the specified stopping position (S130).

As soon as a rotor blade has reached its specified stopping position (S140: "Y"), the safety control device/system 10 switches off the power supply to the corresponding adjustment drive (S150) and then activates the corresponding power supply shut-off device or removes the right to switch, or removes the authorization to carry out a deactivation, from the associated pitch control device/system 5, 5', so that the power supply shut-off device is reactivated or becomes reactivated (S160). By means of this, the associated pitch brake is also closed (S160).

If the safety control device/system 10 determines that the position and/or the movement of a rotor blade is outside the permissible tolerance range (S110: "N"), the safety control device/system 10 also reactivates the corresponding power supply shut-off device 9.1 or 9.1' or removes the right to switch, or removes the authorization to carry out a deactivation, from the associated pitch control device/system 5, 5'.

It can be seen from a comparison with FIG. 2 that, on the one hand, when the stopping position has been reached in a regular way, the power supply from the energy storage device is no longer disconnected by the deactivated power supply shut-off device 9.1 or 9.1', which is protected by means of this. On the other hand, it becomes clear that the rotor blades can be moved into stopping positions within the predetermined shut-off ranges as long as the safety control device/system 10 effects or enables the deactivation of the corresponding power supply shut-off device. By means of this, the rotor blades can advantageously be parked further within the shut-off ranges, and, in this way, the likelihood of any unintentional, wind-induced slipping out can be reduced.

Figure 4:
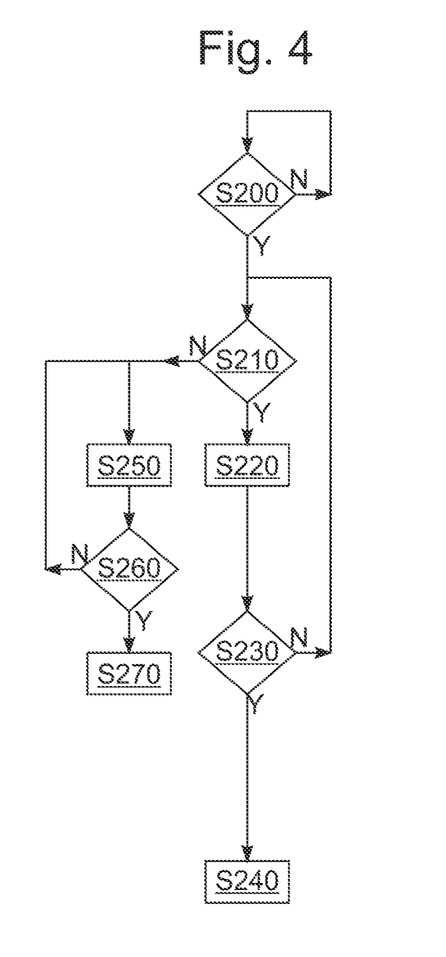
FIG. 4 shows a method of operating the wind energy installation in accordance with a further embodiment of the present invention.

FIG. 4 shows a method of operating the wind energy installation in accordance with a further embodiment of the present invention. Again, in the event of a malfunction of the source of energy 6 (S200: "Y"), a switchover is made to a failure mode of operation.

In this failure mode of operation, the safety control device/system 10 monitors the position and/or movement of the rotor blades 2, 2' (S210) by means of the redundant sensors 8.1-8.2'.

In addition, the rotor blades are moved in the direction of the spinning position or the feathered position (S220).

In this context, when a rotor blade reaches the corresponding shut-off range about this position (S230: "Y"), its power supply shut-off device 9.1 and/or 9.1' shuts off its power supply from the energy storage device and closes its pitch brake 4 and/or 4' (S240), i.e. it functions as a pitch brake closing switching device at the same time.

Figure 1A:
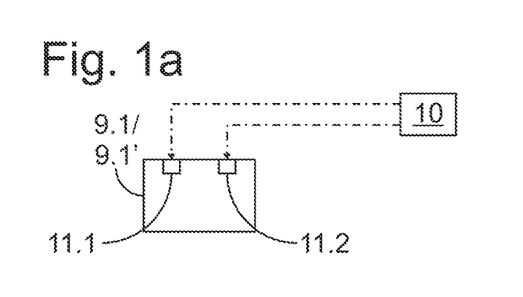
FIG. 1a shows an enlarged representation of a portion of FIG. 1.

If the safety control device/system 10 determines that the position and/or the movement of a rotor blade is outside a permissible tolerance range (S210: "N"), for example if its distance to the shut-off range to be approached does not decrease in the intended manner, for example because the corresponding adjustment drive is defective, the safety control device/system 10 itself closes the pitch brake of this rotor blade and switches to a blocking mode in which it prevents this pitch brake from being opened and in which it prevents this adjustment drive from being supplied with energy from the energy storage device (S250). For this purpose, the safety control device/system 10 switches two switching means 11.1, 11.2, for example in the corresponding power supply shut-off device, as indicated in the enlarged representation 1a of FIG. 1. A deactivation (S270) of this blocking mode requires a manual input (S260: "Y") individually for the respective adjustment drive.

Although example embodiments have been explained in the preceding description, it is to be noted that a variety of variations are possible. For example, two different aspects of the present invention have been explained separately, with reference to FIGS. 3, 4 in particular. This illustrates that these aspects may be realized independently of each other. However, as can be seen from the synopsis of these figures and the associated description, the two aspects can also be combined, that is in particular, in the failure mode of operation, the safety control device/system can effect and/or enable a deactivation of the power supply shut-off device, as well as, instead of a pitch brake closing switching device, close the corresponding pitch brake and then switch to the blocking mode. In addition, it has already been pointed out that, instead of pitch control devices/systems 5, 5' which are specific to a particular blade, in one variation, a (common or first) pitch control device/system can also control both adjustment drives 3, 3', according to one embodiment individually. It is also to be noted that the example embodiments are merely examples which are not intended to limit the scope of protection, the applications and the structure in any way. Rather, the preceding description provides the person skilled in the art with a guideline for the implementation of at least one example embodiment, whereby various modifications, in particular with regard to the function and the arrangement of the components described, can be made without departing from the scope of protection as it results from the claims and combinations of features equivalent to these.

| | List of Reference Signs |
|---|---|
| 1 | rotor |
| 2/2' | first/further rotor blade |
| 3/3' | first/second adjustment drive |
| 4/4' | first/further pitch brake |
| 5/5' | first/further pitch control device/system |
| 6 | source of energy |
| 7/7' | energy storage device |
| 8.1-8.2' | sensor |
| 9.1-9.2' | power supply shut-off device/pitch brake closing switching device |
| 10 | safety control device/system |
| 11.1, 11.2 | switching means |

What is claimed is:

1. A method of operating a wind energy installation including a rotor with a first rotor blade that can be adjusted in terms of its angle, a first adjustment drive for adjusting the first rotor blade, and a safety control device/system, the method comprising:
in a normal mode of operation, supplying the first adjustment drive with energy from an energy source and controlling the first adjustment drive with a first pitch control device/system;
in a failure mode of operation:
switching the supply of energy to the first adjustment drive from the energy source over to a first energy storage device if switching the supply of energy has not already occurred, and
monitoring at least one of a position or a movement of the first rotor blade with the safety control device/system; and
in the failure mode of operation, at least one of:
adjusting the first rotor blade with the first adjustment drive in a direction of a predetermined stopping position, while enabling or effecting with the safety control device/system, based on the monitored position or movement, a deactivation of a first power supply shut-off device that is configured to cut off the supply of energy to the first adjustment drive from the first energy storage device in response to a position of the first rotor blade being in a shut-off range, or
based on the monitored position or movement, closing a first pitch brake using the safety control device/system and activating with the safety control device/system a first blocking mode in which at least one of the supply of energy to the first adjustment drive from the first energy storage device or an opening of the first pitch brake is prevented, wherein the first pitch brake is configured for stopping the first rotor blade, and wherein the safety control device/system closes the first pitch brake instead of a pitch brake closing switching device that is configured to close the first pitch brake in response to a position of the first rotor blade being in a pitch brake closing range.

2. The method of claim 1, wherein at least one of:
monitoring at least one of a position or a movement of the first rotor blade comprises monitoring in a redundant manner; or
the first adjustment drive comprises at least one electric motor or at least one hydraulic actuator.

3. The method of claim 2, wherein at least one of:
monitoring in a redundant manner is carried out with at least two redundant sensors; or
the at least one electric motor is a DC motor.

4. The method of claim 1, wherein at least one of:
the stopping position is within the shut-off range; or
the stopping position is specified based on at least one of a condition of the wind energy installation or a condition of the environment of the wind energy installation.

5. The method of claim 1, further comprising, after the stopping position has been reached, switching off the supply of energy to the first adjustment drive from the first energy storage device with the safety control device/system before enabling or effecting an activation of the first power supply shut-off device with the safety control device/system.

6. The method of claim 1, further comprising:
enabling or effecting an activation of the first power supply shut-off by the safety control device/system in response to the detection of a fault while the first rotor blade is moved to the stopping position.

7. The method of claim 1, wherein adjusting the first rotor blade with the first adjustment drive in a direction of a predetermined stopping position comprises controlling the first adjustment drive with the first pitch control device/system or the safety control device/system.

8. The method of claim 1, further comprising:
shutting off the power supply to the first adjustment drive from the first energy storage device with a second power supply shut-off device in response to an adjustment of the first rotor blade beyond the first shut-off range into a second shut-off range.

9. The method of claim 1, wherein activating the first blocking mode comprises at least one of:
switching of at least two switching means;
switching off of the supply of energy to the first adjustment drive; or
prevention of a controlling of the first adjustment drive to adjust the first rotor blade.

10. The method of claim 1, further comprising a deactivation of the first blocking mode by at least one of an individual input for the first adjustment drive or a manual input for the first adjustment drive.

11. The method of claim 1, wherein the rotor includes at least one second rotor blade that can be adjusted in terms of its angle, and a second adjustment drive for adjusting the second rotor blade, the method further comprising:
in the normal mode of operation, supplying the second adjustment drive with energy from the energy source and controlling the second adjustment drive with the first pitch control device/system or a second pitch control device/system;
in the failure mode of operation:
switching the supply of energy to the second adjustment drive from the energy source over to the first energy storage device or a second energy storage device, and monitoring at least one of a position or a movement of the second rotor blade with the safety control device/system; and in the failure mode of operation, at least one of:
adjusting the second rotor blade with the second adjustment drive in a direction of a predetermined stopping position, while enabling or effecting with the safety control device/system, based on the monitored position or movement of the second rotor blade, a deactivation of a second power supply shut-off device that is configured to cut off the supply of energy to the second adjustment drive from the first energy storage device or the second energy storage device in response to a position of the second rotor blade being in a shut-off range, or based on the monitored position or movement of the second rotor blade, closing a second pitch brake configured for stopping the second rotor, using the safety control device/system instead of a pitch brake closing switching device that is configured to close the second pitch brake blade in response to a position of the second rotor blade being in a pitch brake closing range, and activating with the safety control device/system a second blocking mode, independent of the first blocking mode and in which at least one of the supply of energy to the second adjustment drive from the first or second energy storage devices or an opening of the second pitch brake is prevented.

12. A computer program product for operating a wind energy installation that includes a rotor with a first rotor blade that can be adjusted in terms of its angle, a first adjustment drive for adjusting the first rotor blade, and a safety control device/system, the computer program product comprising a program code stored on a non-transitory, computer readable medium, the programming code configured to, when executed by a computer, cause the computer to carry out the method of claim 1.

13. A wind energy installation, comprising:
a rotor with a first rotor blade configured for angular adjustment;
a first adjustment drive configured for adjusting the first rotor blade;
a safety control device/system;
means for supplying the first adjustment drive with energy from an energy source and for controlling the first adjustment drive with a first pitch control device/system in a normal mode of operation;
means for switching the supply of energy to the first adjustment drive from the energy source over to an energy storage device in a failure mode of operation;
means for monitoring at least one of a position or a movement of the first rotor blade with the safety control device/system in a failure mode of operation; and
at least one of:
means for adjusting the first rotor blade with the first adjustment drive in a direction of a predetermined stopping position, while enabling or effecting with the safety control device/system, based on the monitored position or movement, a deactivation of a first power supply shut-off device that is configured to cut off the supply of energy to the first adjustment drive from the energy storage device in response to a position of the first rotor blade being in a shut-off range, or
means for, based on the monitored position or movement:
closing a first pitch brake configured for stopping the first rotor blade, using the safety control device/system instead of a pitch brake closing switching device that is configured to close the first pitch brake in response to a position of the first rotor blade being in a pitch brake closing range, and
activating with the safety control device/system a first blocking mode in which at least one of the supply of energy to the first adjustment drive from the energy storage device or an opening of the first pitch brake is prevented.

* * * * *